United States Patent [19]

Hinderer

[11] 4,317,902

[45] Mar. 2, 1982

[54] SO$_3$-CONTAINING AROMATIC POLYAMIDES

[75] Inventor: Helmuth E. Hinderer, Pensacola, Fla.

[73] Assignee: Monsanto Company, St. Louis, Mo.

[21] Appl. No.: 151,498

[22] Filed: May 19, 1980

[51] Int. Cl.$^3$ .............................................. C08G 69/32
[52] U.S. Cl. .................................... 528/337; 528/172; 528/173; 528/336; 528/341; 524/606; 524/138; 524/104; 524/223
[58] Field of Search ........................ 528/337, 172, 173

[56] References Cited

U.S. PATENT DOCUMENTS 3,322,728  5/1967  Hill et al. ............................. 528/337
3,931,119  1/1976  Leblanc ................................ 528/337

*Primary Examiner*—Harold D. Anderson
*Attorney, Agent, or Firm*—John W. Whisler

[57] ABSTRACT

Certain fiber-forming aromatic polyamides having a high solubility in organic solvents used in their preparation are provided. The polyamides are prepared from diacid chlorides and from diamines containing sulfonate linkages by the low temperature solution polymerization technique. Fibers of the polyamides have a high modulus to tenacity ratio.

7 Claims, No Drawings

SO₃-CONTAINING AROMATIC POLYAMIDES

BACKGROUND OF THE INVENTION

A. Field of the Invention

This invention relates to aromatic polyamides having a very high solubility in organic solvents such as in dimethylacetamide (DMAc) hexamethylphosphortriamide (HPT) and N-methylpyrrolidone (NMP).

B. Description of the Prior Art

Wholly aromatic polyamides with an all para orientation, such as the polyterephthalamide of paraphenylene diamine or 4,4'-di-aminobenzanilide are conventionally prepared by the low temperature solution polymerization techniques whereby an appropriate diamine(s) and acid halide(s) are reacted at low temperatures in a suitable organic solvent, such as, DMAc, HPT or NMP, to provide a solution of the polyamide (i.e. dope) which can be spun directly into fibers. Unfortunately, such polyamides exhibit poor solubility in these solvents even with added inorganic salts such as LiCl and, therefore, only dilute solutions of the polyamides are obtained ($\leq 10\%$ polymer solids). Consequently, the spinning of these dopes into fibers involves the handling of very large quantities of solvent which renders fiber production via such dopes expensive and commercially unattractive.

SUMMARY OF THE INVENTION

The present invention provides fiber-forming aromatic polyamides having a high solubility in organic solvents used in their preparation, such as in DMAc, HPT, NMP, etc., without the use of inorganic salts.

The polyamides of the present invention are characterized in having recurring units of the general formula:

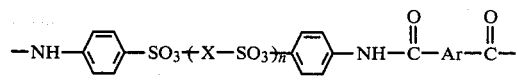

wherein n is 1 or 0, Ar is

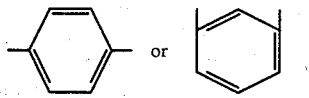

and X is a divalent radical selected from the group consisting of

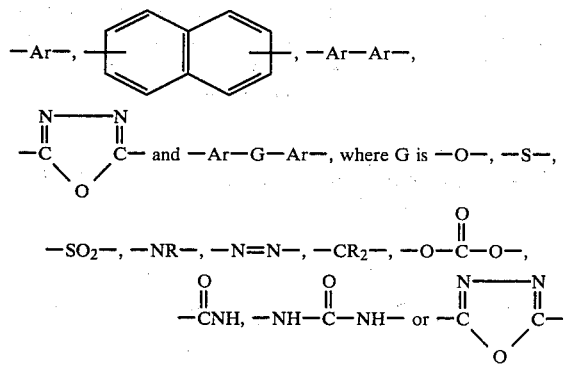

where R is H, alkyl or aryl, with the proviso that in the above formula, when n is 0, the SO₃ group may be oriented

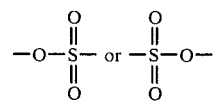

and, when n is 1, the SO₃ groups are oriented in opposite directions, i.e.,

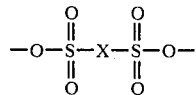

(head-to-head) or

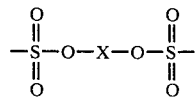

(tail-to-tail).

The polyamides of the present invention may be prepared by the conventional low temperature solution polymerization technique by reacting substantially equimolar amounts of an appropriate sulfonate-containing diamine of the formula

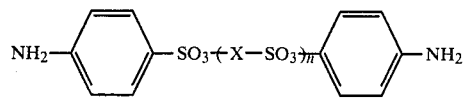

with an acid chloride of the formula ClOC—X—COCl in a suitable organic solvent such as DMAc at a temperature below about 100° C. Sufficient solvent is preferably used to provide a polyamide solution having a polymer concentration (i.e. solids concentration) of at least 10% by weight and, preferably, 15% by weight or higher. The resulting polyamide solution or dope can be spun directly into fibers using conventional solution spinning techniques. Fibers prepared from the polyamides of the invention are characterized in having a high modulus to tenacity ratio.

The diamines of the above formula may be prepared by conventional procedures. For example, 4,4'-diaminophenylbenzene sulfonate may be prepared by the condensation of N-acetylsulfanilyl chloride with p-hydroxy-acetanilide in a mixture of chloroform and ethyl acetate (solvent) containing triethylamine as an acid acceptor. The resulting di-N-acetyl derivative

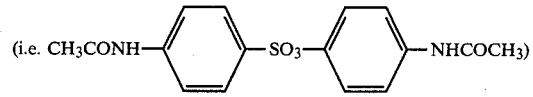

is hydrolyzed under mild conditions for example, with dilute hydrochloric acid in ethanol at reflux for a period of time sufficient to remove the acetyl groups without breaking the —SO₃—linkage. The free diamine is then formed, for example, by adding dilute NaOH to the reaction mixture until it is slightly alkaline and may be purified by recrystallization from ethanol.

PREFERRED EMBODIMENTS OF THE INVENTION

From the standpoint of cost and commercial availability of monomers, preferred polyamides of the present invention are those represented by the above formula where n is 0 or n is 1 and x is —Ar—O—Ar—.

The following examples are given to further illustrate the invention.

EXAMPLE 1

In this example the polyterephthalamide of 4,4'-diaminophenylbenzenesulfonate was prepared by polymerizing terephthaloyl chloride (TCl) and 4,4'-diaminophenylbenzenesulfonate (DPBS) in DMAc. The polymerization was conducted under a blanket of inert gas (nitrogen) in a 125 ml., 3-necked conical flask equipped with a gas inlet adapter to provide a blanket of inert gas, a stirrer with a Teflon ® blade and a drying tube.

To an ice-water chilled solution of 1.320 grams (0.005 mole) of DPBS in 12 ml. of dry DMAc contained in the flask was added 1.016 grams (0.005 mole) of TCl in one portion with stirring. The ice-water bath was removed after 5 minutes and the light yellow, slightly turbid dope was stirred at ambient temperature for 2 hours. The turbidity slowly disappeared. Lithium carbonate (0.74 grams) was added and stirring continued to neutralize the dope. A small portion of the dope was used to cast films at 70°-80° C. which after washing in water and drying were transparent, flexible and strong. The remainder of the dope was diluted with 20 ml. of DMAc and was coagulated with water in a Waring blender. The stringy precipitate was slurried with a water and methanol mixture, and then was dried in vacuum to yield 1.8 grams of product having an inherent viscosity of 0.9 as determined at 25° C. on a 0.5% solution thereof in DMAc containing 5% LiCl.

EXAMPLE 2

In this example the polyisophthalamide of DPBS was prepared using the same apparatus and general procedure described in Example 1. In this instance 6.09 grams (0.03 mole) of isophthaloyl chloride (ICl) was added to a chilled solution of 7.98 grams (0.03 mole) of DPBS in 50 ml of dry DMAc. The ice-water bath was removed after 10 minutes and the dope was stirred at ambient temperature for 3 hours. 3.0 grams of calcium carbonate was added to the dope and the dope was then briefly heated at 80°-90° C., cooled, diluted with 50 grams of dry DMAc and coagulated with water in a Waring blender. The resulting precipitate was repeatedly washed with water and dried under vacuum to yield 11.5 grams of white, fluffy product having an inherent viscosity of 1.4.

EXAMPLE 3

In this example the polyterephthalamide of DPBS was prepared under a blanket of helium in a 1000 ml., 3-necked, round-bottomed flask equipped with a gas-inlet adapter, a stirrer and a drying tube using the same general procedure used in Example 1. In this instance 29.07 grams (0.110 mole) of DPBS were dissolved in 190 ml of dry DMAc and to this solution was added 22.33 grams (0.110) of TCl were added. The ice-water bath was removed after 15 minutes and the dope containing 18.8% solids was then stirred at ambient temperature for 3 hours and at 60°-70° C. for ½ hour before the turbidity disappeared. Then 8.2 grams of lithium carbonate was added and the mixture was stirred at 50°-60° C. for 1 hour, transferred to a small spinning bomb and pressurized with nitrogen to about 300 psig to degas for spinning. The inherent viscosity of the polymer was 1.9. Other polymers similarly prepared had inherent viscosities in the range of 2.1 to 2.5.

EXAMPLE 4

The polymer solution prepared in Example 3 was dry jet-wet spun to fibers by extruding it through a 4.5 mil (0.1143 mm), 5-hole spinneret into a coagulation bath consisting of water at 5°-15° C. The spinneret was kept 2.5 cm above the coagulation bath. After passage under a guide in the bath, the fibers were passed over a water wash roll rotating in 25° C. water, through a 90° C. water bath or cascade, over another wash roll rotating in 25°-40° C. water, a steam heated drying roll and, finally, were hot stretched 1.46 times, over a hot-shoe at 290° C. and wound onto a bobbin. The total as-spun stretch imparted to the fibers was 3.58 times with the jet stretch being 1.23 times and the cascade stretch being 2.06 times.

The tensile properties of the fiber bundle before and after hot-stretching were measured using an Instron Tester (Instron Engineering Corporation, Canton, Mass.) providing an extension rate of 10% per minute with a gauge length of 10 cm being used. The properties are given in the following table:

TABLE I

|  | As Spun | Hot-Stretched |
|---|---|---|
| denier (dpf) | 8 | 4.1 |
| tenacity (gpd) | 1.75 | 4.1 |
| elongation (%) | 17.3 | 2.8 |
| initial modulus (gpd) | 71.8 | 192 |
| toughness | — | 0.06 |

EXAMPLE 5

In this example the polyterephthalamide of bis(4-aminophenyl)4,4'-diphenylether disulfonate was prepared using the same apparatus and general procedure described in Example 1. In this instance 1.01 grams (0.005 mole) to TCl was added to a chilled solution of 2.56 grams (0.005 mole) of the above-mentioned disulfonate in 15 ml of dry DMAc. The ice-water bath was removed after 10 minutes and the dope was stirred at ambient temperature for 2 hours. 0.24 grams of lithium hydroxide was then added to the dope and stirring was continued for two additional hours. The dope was then coagulated with water in a Waring blender. The resulting precipitate was washed in water, dried under vacuum to yield 2.9 grams of a white, fluffy product having an inherent viscosity of 1.0.

I claim:

1. A fiber-forming polyamide characterized in having recurring units of the formula:

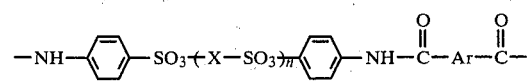

wherein n is 1 or 0, Ar is

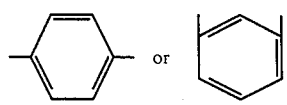

and X is a divalent radical selected from the group consisting of

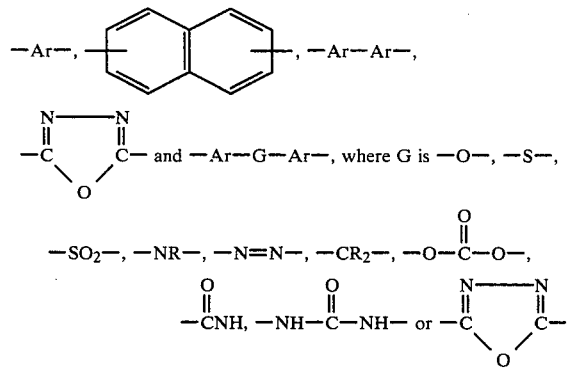

$-SO_2-$, $-NR-$, $-N=N-$, $-CR_2-$, $-O-\overset{\overset{O}{\|}}{C}-O-$, $-\overset{\overset{O}{\|}}{C}NH$, $-NH-\overset{\overset{O}{\|}}{C}-NH-$ or $-\overset{\phantom{x}}{C}\underset{O}{\overset{N-\!\!\!-\!\!\!-N}{\diagdown\diagup}}C-$ where R is H, alkyl or aryl, with the proviso that in the above formula when n is 0 the SO$_3$ group may be oriented

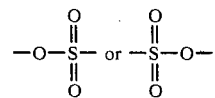

and when n is 1 the SO$_3$ groups are oriented in opposite directions.

2. The polyamide of claim 1 wherein n is 0.
3. The polyamide of claim 2 wherein Ar is

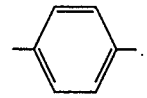

4. The polyamide of claim 1 wherein n is 1 and x is —Ar—O—Ar—.
5. The polyamide of claim 4 wherein Ar is

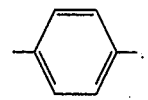

6. The polyamide of claim 1 in the form of a fiber.
7. The polyamide of claim 2 in the form of a fiber.

* * * * *